United States Patent [19]

Davis

[11] Patent Number: 4,499,611
[45] Date of Patent: Feb. 19, 1985

[54] PRODUCTION OF BREATHING MATERIALS

[76] Inventor: Murray A. Davis, 4874 Cote des Neiges Rd., Apt. 1001, Montreal, Quebec, Canada, H3V 1H4

[21] Appl. No.: 455,824

[22] Filed: Jan. 5, 1983

[51] Int. Cl.³ .................. A41D 19/02; B29D 7/18
[52] U.S. Cl. ................................ 2/169; 2/167; 2/243 A; 2/243 B; 2/DIG. 1; 264/158
[58] Field of Search .............. 2/169, 168, 167, 159, 2/161 A, 161 R, 158, 243 R, 243 A, 243 B, DIG. 1; 264/158, 258, 225, 297.1, 154, 317, DIG. 48, DIG. 70

[56] References Cited

U.S. PATENT DOCUMENTS

| | | | |
|---|---|---|---|
| 2,296,305 | 9/1942 | Roberts | 264/55 |
| 2,577,284 | 12/1951 | Steine | 2/168 X |
| 3,247,299 | 4/1966 | Zaha | 264/158 |
| 3,539,667 | 11/1970 | Nameishi | 264/56 |
| 3,565,982 | 2/1971 | Day | 264/53 |
| 3,608,036 | 9/1971 | Peeso, Jr. | 264/158 |
| 3,668,056 | 6/1972 | Hayes, Jr. | 161/159 |
| 3,700,533 | 10/1972 | Schmitz | 264/158 X |
| 3,787,546 | 1/1974 | Pratt et al. | 264/DIG. 70 X |
| 4,139,591 | 2/1979 | Jurisich | 264/258 X |

*Primary Examiner*—Louis K. Rimrodt
*Assistant Examiner*—Judith L. Kravitz
*Attorney, Agent, or Firm*—Cushman, Darby & Cushman

[57] ABSTRACT

A flexible sheet material shaped article comprises a thermoplastic material having a plurality of spaced breathing apertures extending through the thickness thereof, each breathing aperture filled with a porous fibrous material. The flexible sheet material shaped article is formed by utilizing a vertical mold, and hanging a plurality of spaced strands of porous fibrous material from the top of the mold. The mold has a plan or cross-sectional shape corresponding to the shape of the article being provided. The mold is then filled with liquid thermoplastic material, and after cooling a slab of thermoplastic material with strands of fibrous material is produced. The slab is then sliced in a dimension perpendicular to the dimension in which the strands extend, and to the desired thickness to provide the flexible sheet material shaped article.

14 Claims, 2 Drawing Figures

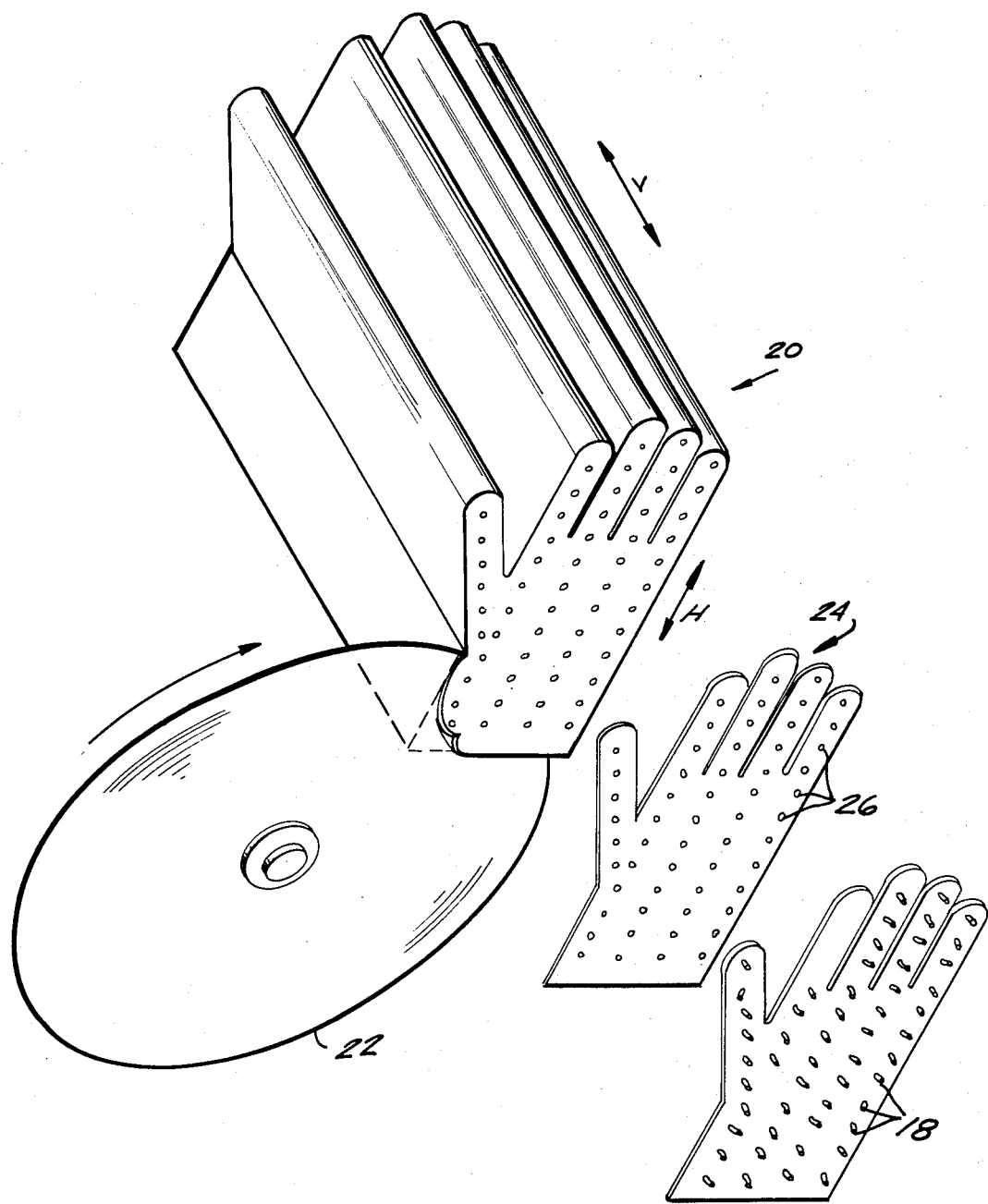

PRODUCTION OF BREATHING MATERIALS

BACKGROUND AND SUMMARY OF THE INVENTION

There are many applications for flexible sheet material having appropriate "breathing" qualities. For instance most articles of clothing, particularly gloves, shoe uppers and soles, and the like, must have appropriate breathing qualities to be useful. Natural leather, and other natural materials, have appropriate breathing qualities, but when it is desired to make useful articles out of synthetic material, the breathing qualities are usually not present.

According to the method of the present invention, it is possible to make flexible sheets of synthetic, or other thermoplastic materials that have appropriate breathing qualities so that they can be used in place of natural leather, or the like, in articles of clothing and for other useful articles that require significant breathing characteristics.

The method according to the invention is practiced by utilizing a mold elongated in a first dimension, and having a plan or cross-sectional shape corresponding to the desired shape of the sheet material articles being produced. Preferably the mold is oriented so that the first dimension is vertical. A plurality of strands of porous fibrous material, such as strands of natural material (e.g. cotton, wool, or the like) are hung from the top of the mold to extend in the first dimension. Then liquid thermoplastic material is poured into the mold.

After cooling of the thermoplastic material, a slab having a plurality of spaced strands extending therethrough results. The slab is then sliced in a dimension substantially perpendicular to the first dimension (i.e. substantially perpendicular to the dimension of elongation of the strands in the slab), to produce flexible sheets of material having the desired thickness.

The flexible sheets of material according to the present invention comprise thermoplastic sheets having a plurality of spaced breathing apertures extending through the thickness thereof, each breathing aperture filled with a porous fibrous material. The sheet material can be utilized in any application where breathing characteristics are necessary or desirable, and may have the configuration of a glove blank, shoe upper or sole, or other article of clothing.

It is the primary object of the present invention to produce flexible sheets of material having good breathing characteristics. This and other objects of the invention will become clear from an inspection of the detailed description of the invention, and from the appended claims.

BRIEF DESCRIPTION OF THE DRAWINGS

FIG. 2 is a perspective view of a slab produced according to the present invention being sliced into sheets of flexible material.

DETAILED DESCRIPTION OF THE DRAWINGS

Figure 1:
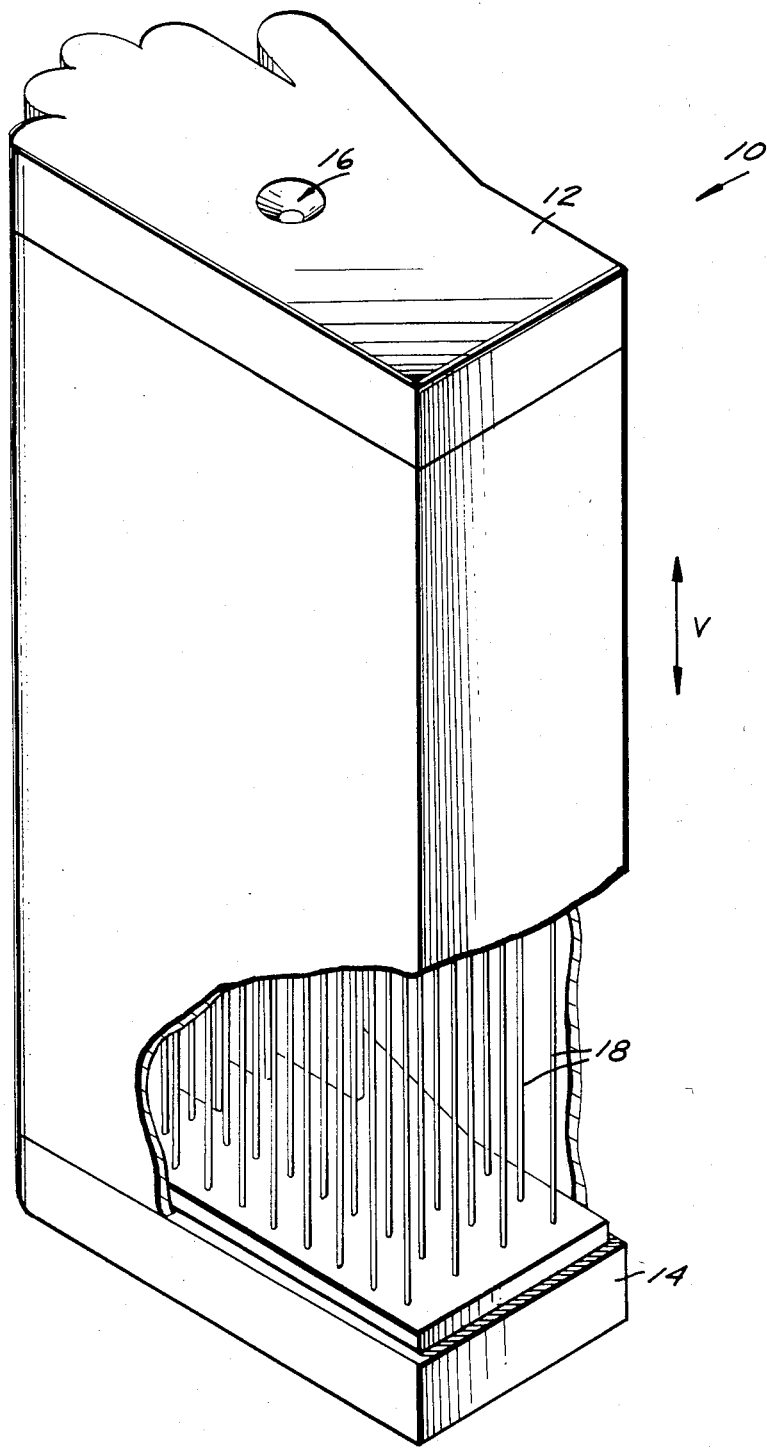
FIG. 1 is a perspective view of an exemplary mold utilized in practicing the method according to the present invention with a portion thereof broken away.

A mold 10 that is utilizable in practicing the present invention is shown in FIG. 1. The mold is elongated in a dimension V, which dimension V is preferably (although not necessarily) vertical during use. The mold includes first and second ends 12, 14, which comprise top and bottom portions, respectively, when the mold is vertical, and an opening 16 is provided in the top thereof for the introduction of thermoplastic material.

In practicing the method of the present invention, a plurality of strands 18 are disposed within the mold in the dimension of elongation V thereof. For instance the strands are hung from the top portion 12 of the mold 10, being held thereto by any suitable conventional means such as clamps, apertures, wire twists, or the like.

The strands 18 are of any suitable porous fibrous material. Examples of suitable fibrous porous material are natural material yarns, such as cotton and wool yarns. However any strands that have the desired porosity to provide desired breathing characteristics in the final article produced may be utilized.

Preferably, the mold 10 has a shape, in plan or cross-section, of the desired article to be produced. In the exemplary embodiment illustrated in FIG. 1, the mold 10 has the general shape of a human hand in plan or cross-section, and is adapted to produce glove blanks.

Once the strands 18 have been properly oriented in the mold 10, the mold is substantially filled with liquid thermoplastic material. The thermoplastic material may, for instance, be poured into opening 16, to substantially fill the mold. The term "thermoplastic material" as used in the present specification and claims includes any moldable material that has sufficient flexibility when thin, and particularly is utilizable for the production of articles of clothing—such as glove blanks, shoe uppers and soles, panels of raincoats—or like articles, such as car seat covers, and tarpaulins, which require suitable breathing characteristics. Typical materials that are eminently suited for use in practicing the invention are vinyl, neoprene, and rubber.

The thermoplastic material is cooled so that it sets, and forms a slab 20 (see FIG. 2) having a plan and cross-sectional configuration corresponding to that of the mold 10. The slab 20 is then sliced, as by utilizing the thin rotary blade 22, in a dimension H. The dimension H is substantially perpendicular to the dimension V (i.e. perpendicular to the dimension of elongation of the strands 18 in slab 20). The slicing is practiced so that final flexible sheet material articles 24 are produced having the desired thickness.

An article 24 of flexible sheet material according to the present invention comprises flexible sheet material having a plurality of spaced breathing apertures 26 extending through the thickness thereof. The breathing apertures are filled with porous fibrous material—i.e. sections of strands 18. The articles 24 are suitable for construction of articles of clothing, and other final articles that require desired breathing characteristics. For instance, a glove blank 24 could be used as the palm portion of a glove, which could be sewn or otherwise affixed to a glove upper of leather, plastic, cloth, or other conventional material, in a conventional manner.

When the mold 10 is oriented vertically (that is dimension V as essentially vertical), the slab formed tends to have a greater strength at the bottom of the mold 10 than at the top. Thus any slices 24 from the slab 20 that was formerly the top of the mold may be discarded, or utilized for articles having lower strength requirements.

It will thus be seen that according to the present invention a shaped piece of flexible sheet material, and a method of forming flexible sheet material according to the invention, have been provided which result in the quick and easy formation of shaped pieces of flexible sheet material having desired breathing characteristics. While the invention has been herein shown in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of forming a porous flexible sheet material utilizing a mold elongated in a first dimension, comprising the steps of:
   (a) disposing a plurality of strands of porous fibrous material in said mold extending substantially along said first dimension;
   (b) substantially filling the mold with a liquid thermoplastic material to provide a slab having a thickness at least several times the thickness of the desired sheet to be formed therefrom;
   (c) cooling the thermoplastic material to provide a slab having a plurality of strands of porous fibrous mterial extending therein; and
   (d) slicing the slab in a dimension substantially perpendicular to said first dimension to provide flexible sheets having the desired thickness and having a plurality of spaced breathing apertures extending through the thickness thereof, the apertures filled with porous fibrous material.

2. A method as recited in claim 1 comprising the further step of utilizing said flexible sheet material to form articles of clothing.

3. A method as recited in claim 2 wherein the mold has the general cross-sectional configuration of a human hand, and wherein the flexible sheets of material produced have a configuration of glove blanks, and wherein articles of clothing are produced by affixing a glove blank to a glove upper part to form a glove.

4. A method as recited in claim 1 wherein said first dimension is essentially vertical during the practice of steps (a) and (b).

5. A method as recited in claim 1 wherein the thermoplastic material is selected from the group consisting essentially of vinyl, neoprene, and rubber.

6. A method as recited in claim 5 wherein the strands are natural material yarn strands.

7. A method as recited in claim 1 wherein the strands are natural material yarn strands.

8. A method as recited in claim 4 wherein the slices of flexible sheet material formed from that portion of the slab that was in the top portion of the mold are discarded.

9. A method of forming breathing flexible sheet material shapes suitable for use in the construction of articles of clothing, and utilizing a mold elongated in a first dimension and having a plan or cross-sectional shape corresponding to the shape of the flexible sheet material shapes to be produced, consisting of the steps of:
   (a) disposing a plurality of strands of porous fibrous material in said mold extending substantially along said first dimension;
   (b) substantially filling the mold with a liquid thermoplastic material to provide a slab having a thickness at least several times the thickness of the desired sheet to be formed therefrom;
   (c) cooling the thermoplastic material to provide a slab having a plurality of strands of porous fibrous material extending therein; and
   (d) slicing the slab in a dimension substantially perpendicular to said first dimension to provide flexible sheet material shapes having the desired thickness and having a plurality of spaced breathing apertures extending through the thickness thereof, the apertures filled with porous fibrous material.

10. A method as recited in claim 9 wherein the mold has the general cross-sectional configuration of a human hand, and wherein the flexible sheet material shapes produced have the shape of glove blanks.

11. A method as recited in claim 9 wherein said first dimension is essentially vertical during the practice of steps (a) and (b).

12. A method as recited in claim 11 wherein the slices of flexible sheet material formed from that portion of the slab that was in the top portion of the mold are discarded.

13. A method as recited in claim 11 wherein the thermoplastic material is selected from the group consisting essentially of vinyl, neoprene, and rubber.

14. A method as recited in claim 13 wherein the strands are natural material yarn strands.

* * * * *